United States Patent
Gary

(10) Patent No.: US 9,155,969 B2
(45) Date of Patent: *Oct. 13, 2015

(54) VIDEO GAME COMPETITION NOTIFICATIONS

(71) Applicant: Sony Computer Entertainment America LLC, San Mateo, CA (US)

(72) Inventor: Nathan Gary, Santa Monica, CA (US)

(73) Assignee: SONY COMPUTER ENTERTAINMENT AMERICA LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,538

(22) Filed: Apr. 13, 2015

(65) Prior Publication Data

US 2015/0238872 A1 Aug. 27, 2015

Related U.S. Application Data

(63) Continuation of application No. 12/582,354, filed on Oct. 20, 2009, now Pat. No. 9,005,028.

(51) Int. Cl.
*A63F 13/87* (2014.01)
*A63F 13/795* (2014.01)
*A63F 13/35* (2014.01)

(52) U.S. Cl.
CPC .............. *A63F 13/795* (2014.09); *A63F 13/35* (2014.09); *A63F 13/87* (2014.09)

(58) Field of Classification Search
CPC ......... A63F 13/12; A63F 13/35; A63F 13/87; A63F 13/795; A63F 2300/204; A63F 2300/572; A63F 2300/8076; H04L 12/588
See application file for complete search history.

(56) References Cited

U.S. PATENT DOCUMENTS

| | | | |
|---|---|---|---|
| 2003/0109297 A1* | 6/2003 | Fukutome | 463/7 |
| 2003/0195023 A1* | 10/2003 | Di Cesare | 463/9 |
| 2009/0176557 A1* | 7/2009 | Hall et al. | 463/25 |

* cited by examiner

*Primary Examiner* — Jasson Yoo
(74) *Attorney, Agent, or Firm* — Kilpatrick Townsend & Stockton LLP

(57) ABSTRACT

Methods and systems are described for automatically sending a popup or other message to another person's electronic device upon finishing a predetermined goal in a video game. The predetermined goal can be, for example, killing a first boss in under five minutes. The message to the friend can include a link or button enabled such that the friend can begin the game on his device in the same room, mission, scenario, etc. that the first player started out in so that the friend can attempt to duplicate or 'one up' the first player's achievement. Friends who are interested in receiving such messages can be determined from existing social networking sites.

20 Claims, 7 Drawing Sheets

VIDEO GAME COMPETITION NOTIFICATIONS

CROSS-REFERENCES TO RELATED APPLICATIONS

This application is a continuation of U.S. application Ser. No. 12/582,354, filed Oct. 20, 2009, now U.S. Pat. No. 9,005,028, entitled "Video Game Competition Notifications," the contents of which are hereby incorporated by reference in their entireties for all purposes.

BACKGROUND

Video games have become beneficial social network opportunities and competitive outlets for many players. The skill that one exhibits in mastering a game can lead to new friends who have something in common, and respect from others who have played the game and have seen first hand how difficult some achievements within the game are to accomplish. The attention, respect, and camaraderie shared by many video games has built a sense of community around some video game titles and platforms.

High score tables have been ubiquitous in many video games, typically being updated with a player's high score and/or level attained as well as the player's initials or signature. High score tables are typically saved in the cartridge or writable memory of a particular video game medium. In the past, one player's high score was not accessible to others who did not play from the same cartridge or memory device.

Networked video games spread the concept of a computerized leaderboard system in which a central server or set of servers tracked the achievements or milestones of players with different systems. Upon reaching a high score, the leaderboard is automatically updated over the network from a message from the console upon which a player accomplished the achievement or milestone.

A 'trophy' system has been implemented to reward players with a trophy (e.g. bronze, silver, gold, platinum) for achieving certain predefined milestones in some games. The trophy system acts as a snapshot of one's gaming ability and/or time investment. These achievements help players judge their skills against others.

Some video game systems have used an 'achievement' concept which rewards points for completing different video games. Points can be earned by performing straightforward tasks, such as winning a game. Points can also be earned by completing hidden tasks, such as finding easter eggs (i.e. undocumented hidden rooms, treasures, and other features) within games. In the point system, a leaderboard tracks the number of points each player has earned from a variety of video games so that friends can compare each others' point scores.

Networked leaderboards have been found to stimulate game play and enhance interest in certain video game titles. However, leaderboards are often only followed by those with a high level of interest in the game and fail to garner a following from users who are less competitive.

BRIEF SUMMARY

Embodiments in accordance with the present disclosure relate to automatically popping up a small note or otherwise displaying a message on a friend's or other person's video game console to inform the person about a milestone or other predetermined goal in a video game that a player has just achieved. The predetermined goal can be a goal set up by the game developer, a gaming community group, or it can be a custom achievement set up by the friends. The pop-up note or other message can include a link, button, or other selectable element such that the friend can click or otherwise select it and begin playing the game starting at a specified location, such as the same scene, room, mission, etc. as the first player started so that the friend can try to best the first player's accomplishment.

An embodiment in accordance with the present disclosure relates to a method of challenging another person to a portion of a video game. The method includes receiving an indicator that a first person playing an instance of a video game has met or exceeded a predetermined goal in a portion of the video game and sending a message to a device associated with the second person, the message indicating that the first person has met or exceeded the predetermined goal.

The message can include a selectable element enabled to begin an instance of the video game for the second person at a specified point and/or the portion of the video game in which the first person met or exceeded the predetermined goal. When the second person clicks on the selectable element, his or her own game console queues up the same video game so that the second person can begin playing and try to outperform the first person.

The message can go to any device registered or otherwise associated with the second person, such as his or her television, mobile phone, pager, as well as his or her game console. Multiple messages can go out to a plurality of friends to entice them to play the game and beat the first player's latest accomplishment.

Other embodiments relate to machine-readable tangible storage media and computer systems which employ or store instructions for the methods described above.

A further understanding of the nature and the advantages of the embodiments disclosed and suggested herein may be realized by reference to the remaining portions of the specification and the attached drawings.

DETAILED DESCRIPTION

Figure 1A:
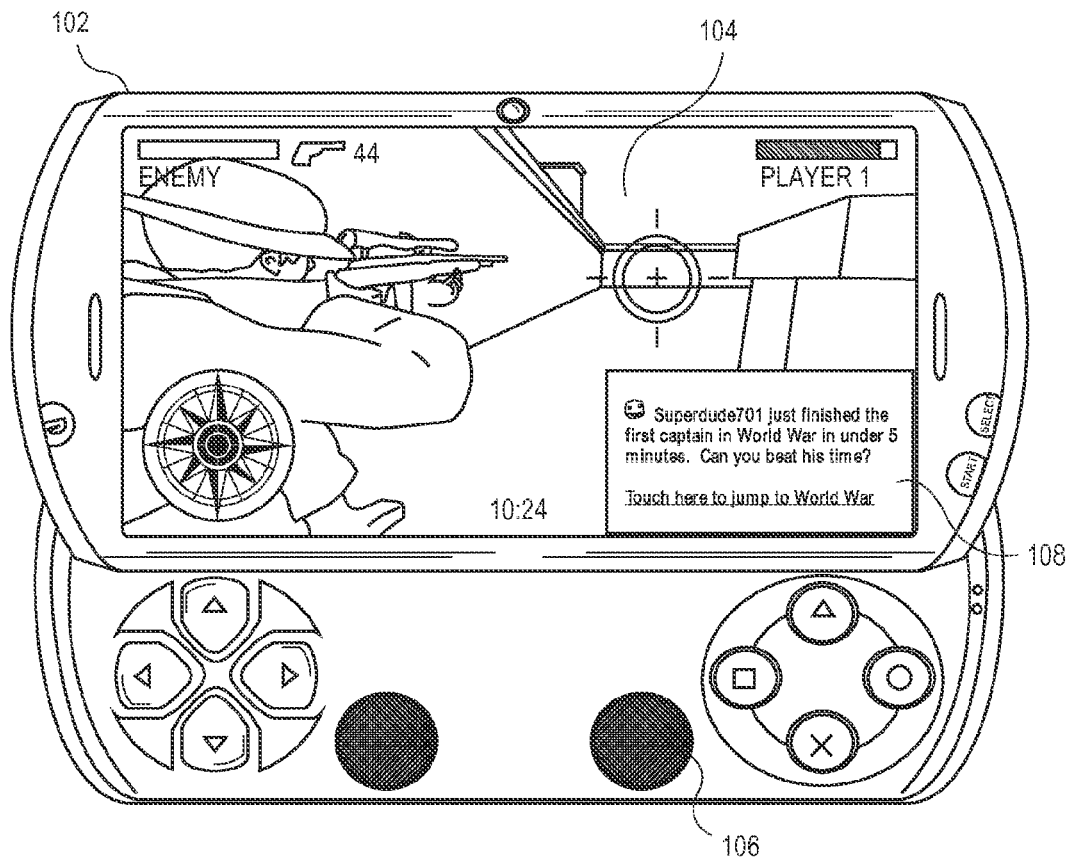
FIG. 1A illustrates a handheld video game device with a message in accordance with an embodiment.

Generally, methods and systems are described for automatically sending a message to another person's electronic device (e.g. phone, personal computer, television, game console) to inform the person that a player just met or exceeded some goal in a video game (e.g. number of enemies killed in a minute, minimal length of time to defeat the first boss). A message can include a popup message which 'pops up' on a device's display and overlays other data on the display. A popup message can be visible temporarily, or it can be permanent or modal until a user acknowledges the message. The message can include a link, software button, or other selectable element such that the person, if on a compatible game console, can click the button and immediately start playing the game in the same challenge area, checkpoint, level, mission, room, scenario, scene, or other portion or specified point in which the player achieved the goal.

A "video game" is any interactive electronic game. An instance of a video game can include a single instantiation or execution of a video game on a game console. A video game title includes a video game which is released to the public in a single event but may have early beta versions and/or later-released patches and upgrades. A video game title can have related video game titles, such as prequels and sequels that are released separately. For example, the God of War® video game title has the God of War® II video game title as a sequel.

A whole group of players can be socially networked through a social networking system as a group or simply as contacts of each other. Each friend or associate can subscribe or unsubscribe as each other's friends, contacts, or other relations. Each friend or associate can indicate whether he or she owns or plays a certain video game title as well indicate his or her interest in hearing about how friends are doing while playing that title.

One of the ways that players can hear about how others are doing is to be informed of certain predefined accomplishments that the other players are achieving. For example, an accomplishment might be for the player to acquire a powerful weapon, attain a high level, or reach a high score. These accomplishments can be pre-set in the video game by the game developers. In some embodiments, one or more of the players can set up a custom achievement. For example, a custom achievement might be to kill ten enemy characters in one minute. In a custom achievement, the number referred to above is not pre-set by the game developers but is specified by the users. For example, novice users may set a lower number of enemy characters to kill, and advanced users may set a higher number.

When one player meets or exceeds the achievement or other predetermined goal while playing an instance of the video game, an indicator is sent from the player's video game console to a central computer system which tracks the various goals and friends. The achievement can include such goals as a length of time that it took to beat a first boss or other main enemy character, the number of enemies that were killed in one minute, a highest number of kills in a death match, the length of time it took to finish a game, and the highest number of headshots dealt in a minute. Other achievements are possible as would be known to one skilled in the art.

The central computer system receives the indicator that the person playing the video game has met or exceeded the predetermined goal. For example, if a player kills ten (or eleven or twelve) enemy characters, then an indicator is received that references the goal and how it was met (or exceeded).

The centralized computer then checks its social networking database to determine who, if anyone, is interested in the game playing ability of the player and would like to receive updates on his or her goals. The database may be a game-specific database, or it can be linked to one of the more broadly used social networking sites on the Internet such as Facebook®, Friendster®, Linkedin®, and MySpace® social networking sites. Interest in the game playing ability of another can be determined by an explicit indicator by the person or the player that the person wants to receive updates on how the player is doing. Interest in the game playing ability of another can also be determined by implicit means, such as looking up whether the person is a friend, competitor, and/or associate of the player who also owns and plays video games.

The computer looks up or otherwise determines a device that is associated with the person who has interest in the game playing ability of the player. For example, the person can have his or her cellular phone number registered in the social networking database. Along with the number, the registration may indicate a preference for how the person prefers to receive video game messages. For example, the user may wish to receive a video of the player achieving the goal so that he has more faith in that it was actually accomplished. As another example, the user, conscious of bandwidth costs, may wish for only a screen shot of the ultimate kill. As yet another example, the user may wish to receive a simple text message so that he does not know exactly how the task was completed and can thus find more enjoyment in figuring out how the player accomplished the goal in the first place.

A message is sent by video, text, audio, or other methods to the person indicating that the player achieved the predetermined goal. The message can pop up on a screen of the person's registered device, be output from its speakers, or otherwise be communicated to the person.

The message can include a selectable element enabled to begin an instance of the video game for the second person. For example, a popup box with the message on the person's game console can have a clickable link. When clicked, the link starts the video game in the same scene, room, etc. as what the player encountered when killing ten enemies. This allows the person to immediately try to 'one up' or beat the first player's score. For example, the person may try to kill eleven (or twelve or thirteen) enemy characters to best his friend and continue the rivalry.

The selectable element can also be an audio element, such as an interactive voice response. For example, the message could be a spoken taunt, emphasizing that one's friend has killed ten enemy characters in one minute. The spoken taunt could, at some point, ask whether the person would like to try to best the score. Using interactive voice response (IVR), the person's spoken "yes" could trigger the game to be loaded in the same mission as where the first player started.

The device which receives the message with the selectable element need not be the device upon which the friend ultimately plays the video game. For example, the friend's phone might receive the message, and the friend selects a link in the message on the phone to accept the challenge. At that point, the server computer can remotely instruct the friend's game console to turn on, spin up the proper game title, and put the friend's character in the same room as the first player was when he beat the goal. Alternatively, the server computer could save the first player's position, level, avatar, and other game state conditions so that the friend's game console could retrieve them later when the person wanted to beat the score.

An "avatar" is a video game character which has been selected among a multiple set of characters by the user. An avatar can have chosen or 'purchased' features, such as a special sword or superpower. An avatar can also have earned features, such as hit points, gold, etc. In some embodiments, an avatar can be saved and used in subsequent game instances.

The message can also indicate measured environmental stress factors that are external to the video game which the first player endured while playing. For example, the first player's handheld game can have accelerometers or a global positioning system (GPS) receiver to measure g-loading and latitude/longitude to determine that the first player achieved the goal while riding in the back seat of a fast moving car on a windy road. The message to the friend can indicate these conditions and challenge the friend to match them. As another example, the console can have temperature gauges to indicate that the player played in sub-zero temperatures, or a humidity meter to indicate that the player played underwater. G-loading, temperature, humidity, wind, and other environmental stress factors can be automatically measured by equipment attached to the first player's game console. Environmental stress factors can also be determined through off-board sensors. For example, a third-party national weather database can indicate that the first player played on the hottest day of the year so far. As another example, the message could say that, after four days of straight rain outside and seven hours of trying, the player was able to finally kill ten enemy characters.

FIG. 1A illustrates a handheld video game device with a message. Handheld device 102 has screen 104 and speaker 106. In the lower right hand corner of screen 104 is pop up box 108 with a challenge message from a friend with the handle, "Superdude701."

Figure 1B:
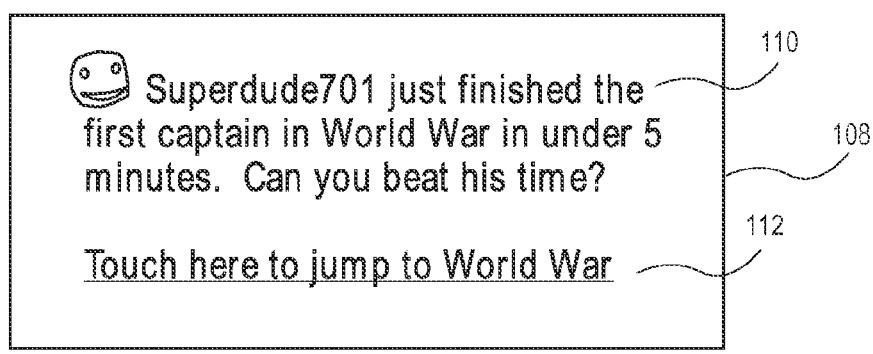
FIG. 1B is a close up of the message of FIG. 1A.

FIG. 1B is a closeup of the message in FIG. 1A. Popup box 108 has Superdude701's message with text 110 and link 112. By clicking link 112, the player playing handheld game device 102 can stop his current game and begin playing the specified video game at the mission in which Superdude701 just beat the predetermined goal.

Figure 2:
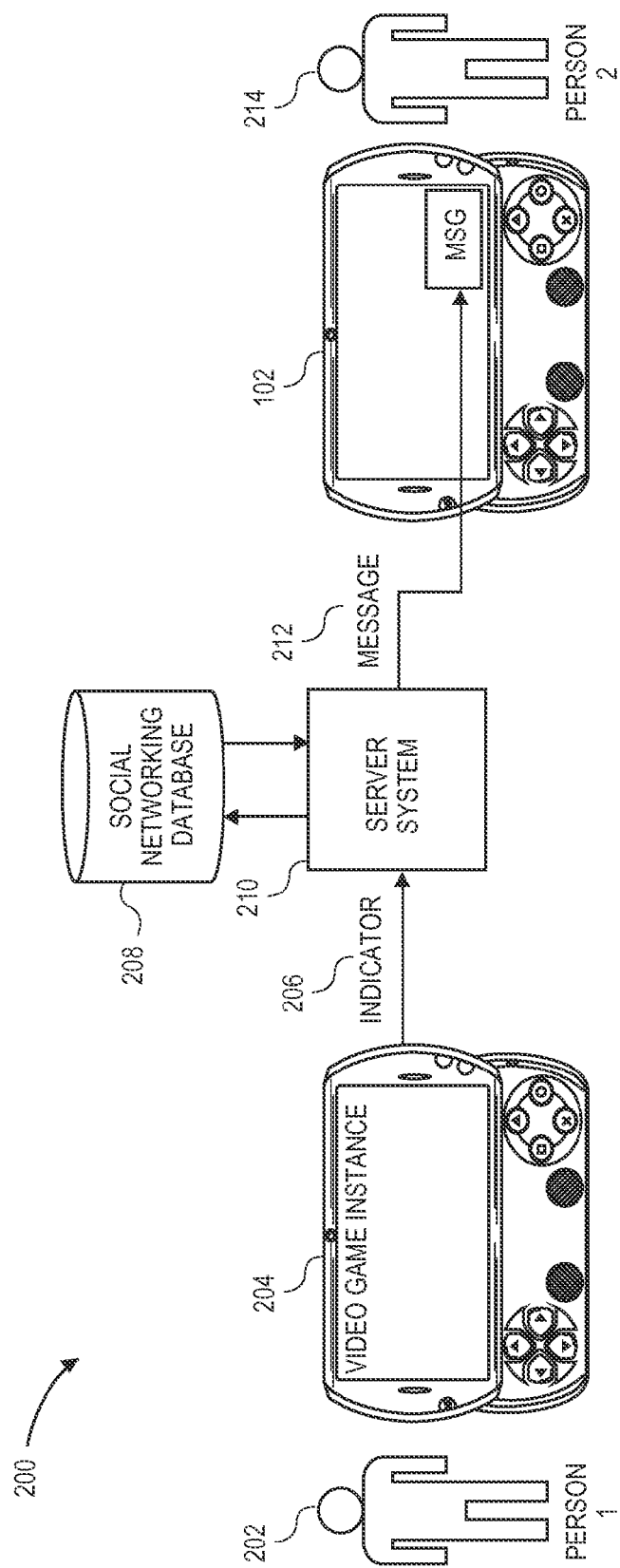
FIG. 2 illustrates a message being sent from a system in accordance with an embodiment.

FIG. 2 illustrates a message being sent in a system. Player 202 plays an instance of a video game on handheld video game device 204. Upon achieving a high score in the video game, indicator 206 is sent from device 204 to server system 210. Server system 210 checks social networking database 208 to see if anyone is registered to receive updates from player 202's game play. Upon determining that person 214 is a friend of player 202, and upon looking up a device associated with person 214, server system 210 sends message 212 to the device, which in this instance is handheld video game device 102. A popup box shows the challenge message.

Figure 3:
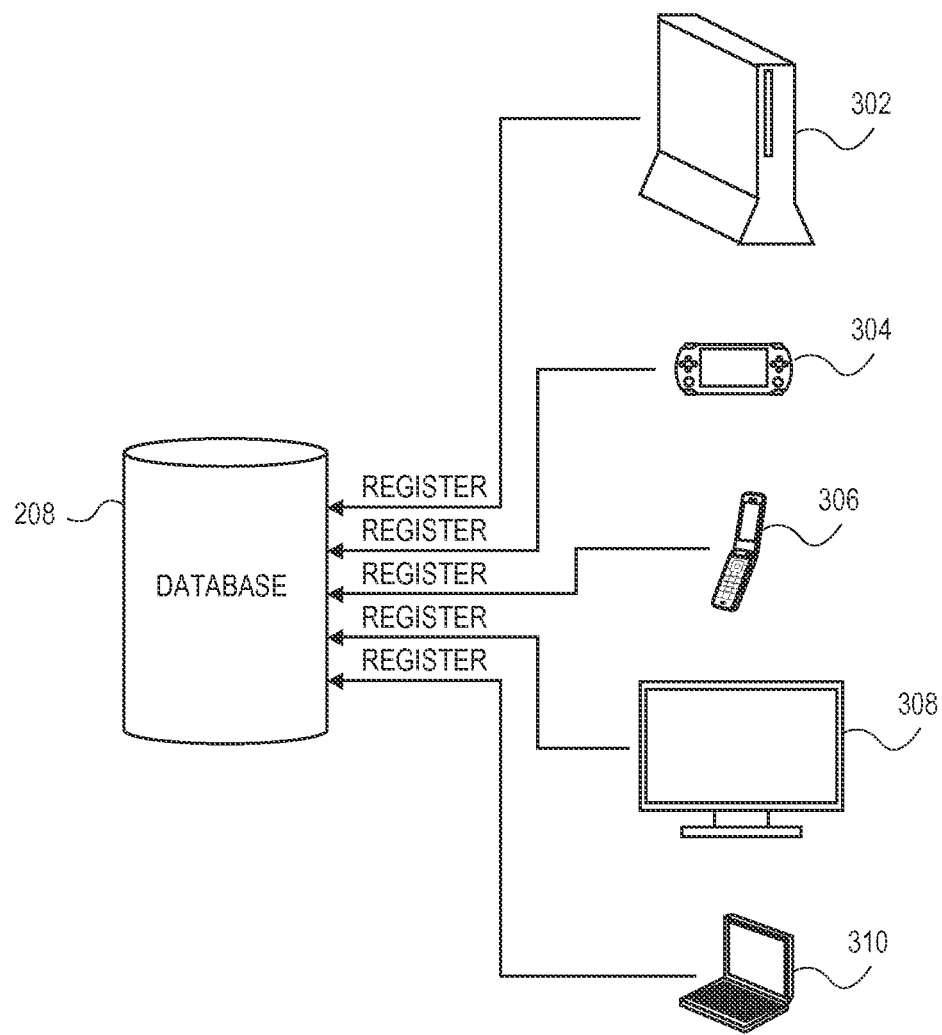
FIG. 3 illustrates registering electronic devices according to an embodiment.

FIG. 3 illustrates the registering of devices in a database. Database 208 stores information about the registration of devices such as the electronic address of a user's device(s). Devices such as game console 302, handheld game device 304, mobile phone 306, television 308, and laptop computer 310 can be registered in database 208. In the exemplary embodiment, the address, phone number, etc. of each device is stored as well as the preferred communication format for each device. As an example of a preferred communication format, a message to mobile phone 306 may be preferred to be in the short message service (SMS) communication format, while a message to laptop computer 310 may be preferred to be in an email.

In some embodiments, specific devices do not need to be registered. For example, an email can be sent to an email address associated with a person, and any one of many devices that can retrieve email message can actually retrieve the email for the person. In other embodiments, a specific device might need to be registered. For example, handheld game device 304, which uses a proprietary message format, may be registered.

Figure 4:
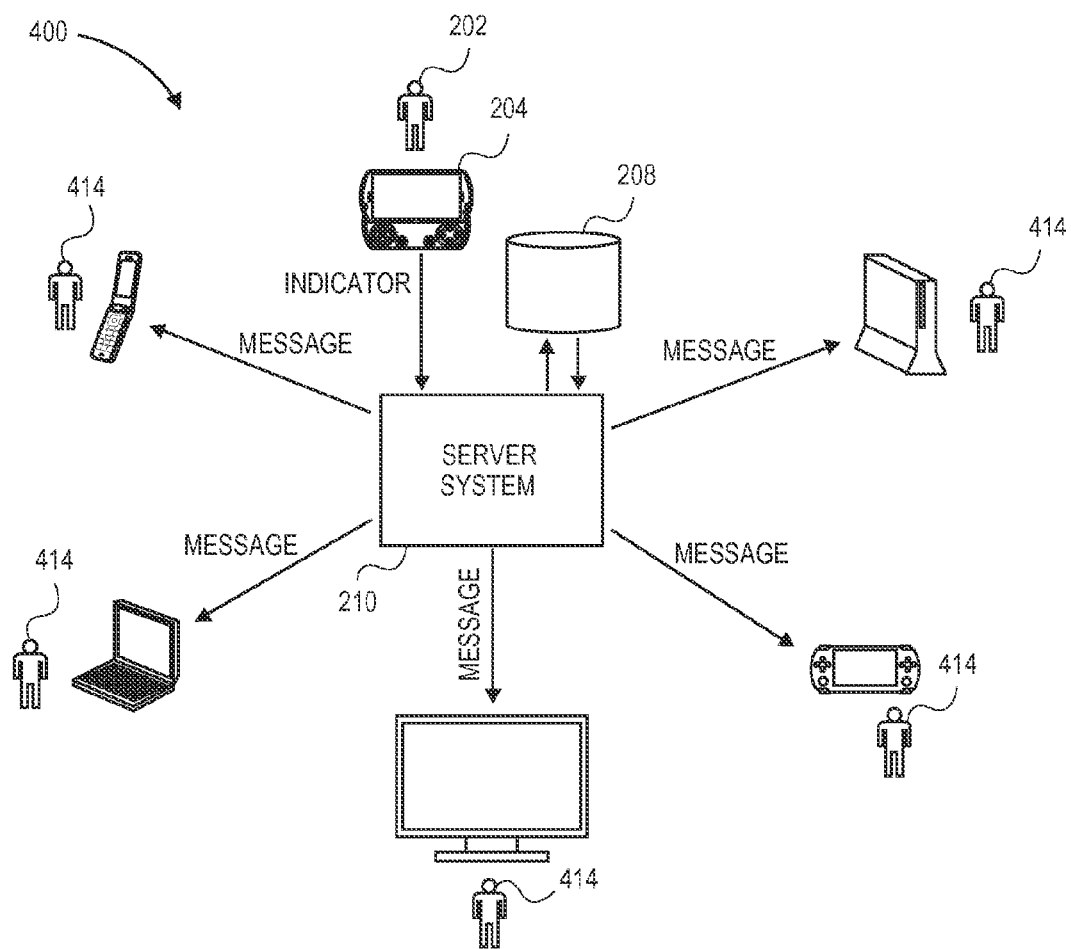
FIG. 4 illustrates a message being sent to multiple friends in a group in accordance with an embodiment.

FIG. 4 illustrates copies of a message being sent to multiple friends in a group. Each of friends 414 is shown with a different device, but some friends may use the same type of device. For example, several friends might register their game consoles, while one friend may register his mobile phone. Regardless of the type of device (e.g. game console, handheld game device, television, personal computer, mobile phone), server system 210 sends messages to friends who are registered in database 208 upon receiving an indicator from user 202's device 204.

The contents of the message may change depending on the type of device to which it is being sent. For example, a message to a television may not include a selectable element, while a message to a game console would include the selectable element.

Figure 5A:
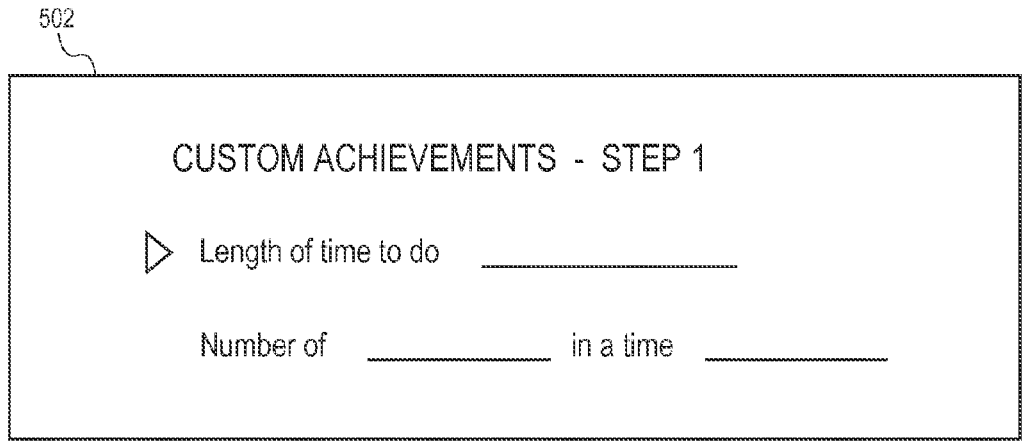
FIGS. 5A-5B illustrate screens upon which a user can supply custom predetermined goals in accordance with an embodiment.

FIG. 5A illustrates a screen upon which a user can set up custom predetermined goals for his or her friends. On screen 502, one can select either a length of time to do X or a number of Y's to do in a certain amount of time Z. For example, one can select a length of time to beat a boss in the video game. As another example, one can select a number of headshots to perform in one minute.

Figure 5B:
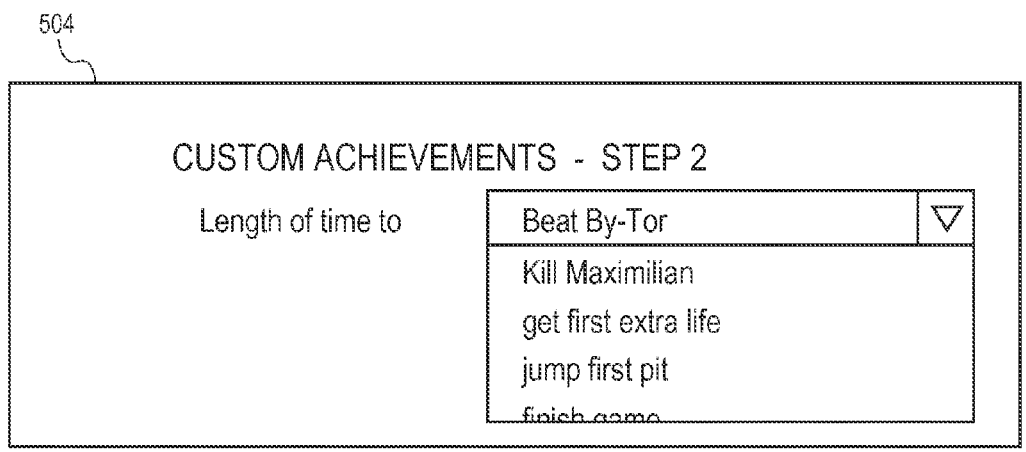

FIG. 5B illustrates another screen upon which a user can set a custom goal. In the exemplary example, the user has opted for a time to "beat By-Tor" as a predetermined goal for himself and his friends. On later screens, the user can specify the time limit to beat By-Tor.

Figure 6:
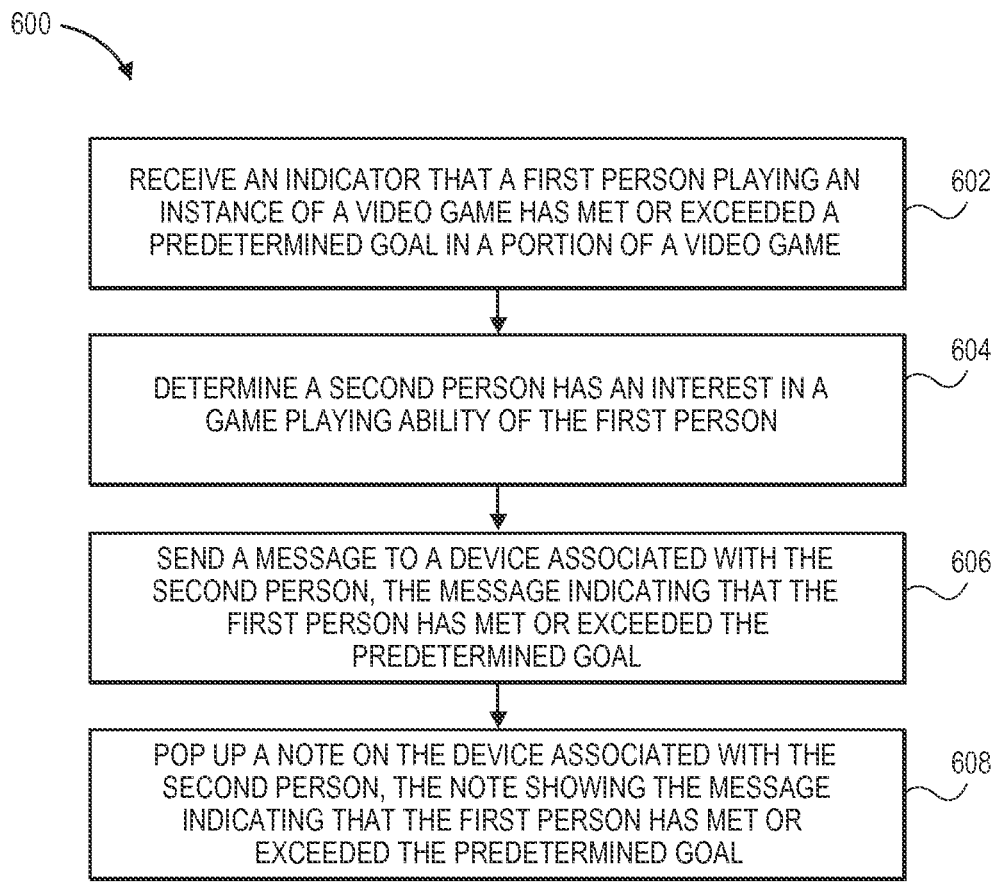
FIG. 6 is a flowchart illustrating an embodiment in accordance with an embodiment.

FIG. 6 shows an example flowchart illustrating process 600 in accordance with one embodiment. This process can be automated in a computer or other machine. The process can be coded in software, firmware, or hard coded as machine-readable instructions and run through one or more processors that can implement the instructions. In operation 602, an indicator is received that a first person playing an instance of a video game has met or exceeded a predetermined goal in a portion of a video game. The portion can be the entire game or a smaller part of the game. In operation 604, it is determined that a second person has an interest in a game playing ability of the first person. In operation 606, a message is sent to a device associated with the second person. The message indicates that the first person has met or exceeded the predetermined goal. In operation 608, a note is popped up on the device associated with the second person. The note shows a message indicating that the first person has met or exceeded the predetermined goal. These operations may be performed in the sequence given above or in different orders as applicable.

Figure 7:
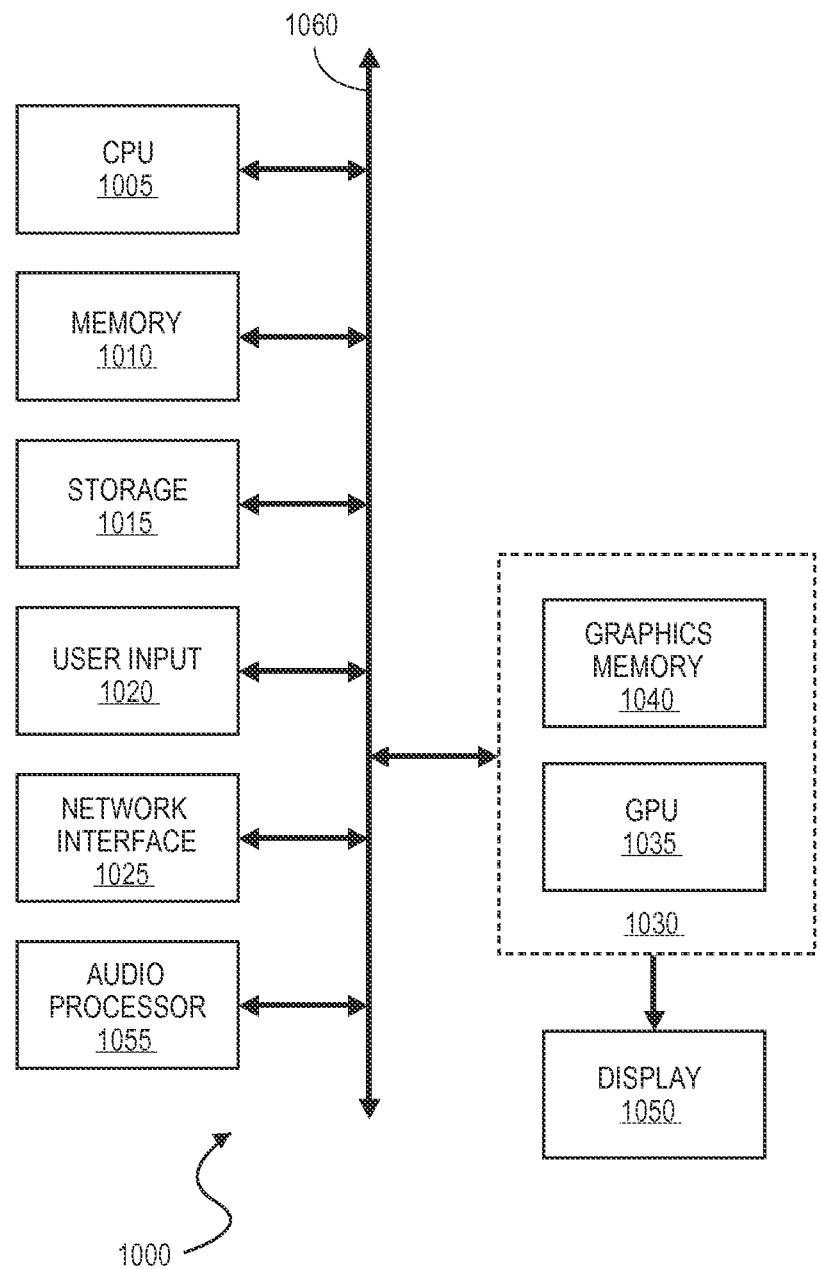
FIG. 7 illustrates an example computer system suitable for use with embodiments of the invention.

FIG. 7 illustrates an example computer system suitable for use with embodiments of the invention. The figure is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more homogeneous or heterogeneous processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000.

The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of challenging another person to a video game, the method comprising:
   receiving by a server, a custom goal for the video game, the custom goal specified by a first person;
   receiving by the server an indicator that a second person playing an instance of the video game has met or exceeded the custom goal in the video game;
   preparing a message indicating that the second person has met or exceeded the custom goal;
   sending the message to an electronic device associated with a third person with a selectable element enabled to begin a second instance of the video game for the third person at a specified point of the video game associated with the custom goal;
   retrieving from an electronic device associated with the second person, a game state condition of the first instance of the video game; and
   beginning the second instance of the video game using the retrieved game state condition on the device associated with the third person in response to a selection of the selectable element.

2. The method of claim 1 wherein the third person registers to the server the electronic device associated with the third person to receive one or more messages.

3. The method of claim 2 wherein the registration specifies a method of receiving the one or more messages on the electronic device associated with the third person.

4. The method of claim 2 wherein the registration specifies a number of video game titles.

5. The method of claim 1 wherein the selectable element is selectable by a spoken approval from the third person.

6. The method of claim 1 wherein the custom goal is based on game playing ability.

7. The method of claim 1 further comprising receiving by the server an indication indicating that a fourth person wishes to subscribe to receive one or more messages from the server and receiving by the server a subsequent indication indicating that the fourth person wishes to unsubscribe from receiving one or more messages from the server.

8. A system for challenging another person to a video game, comprising:
   at least one processor of a server; and
   memory of the server including instructions that, when executed by the processor, cause the system to:
   receive by the server, a custom goal for the video game, the custom goal specified by a first person;
   receive by the server an indicator that a second person playing an instance of the video game has met or exceeded the custom goal in the video game;
   prepare a message indicating that the second person has met or exceeded the custom goal;
   send the message to an electronic device associated with a third person with a selectable element enabled to begin a second instance of the video game for the third person at a specified point of the video game associated with the custom goal;
   retrieve from an electronic device associated with the second person, a game state condition of the first instance of the video game; and
   begin the second instance of the video game using the retrieved game state condition on the device associated with the third person in response to a selection of the selectable element.

9. The system of claim 8 wherein the instructions further cause the system to allow the third person to register to the server the electronic device associated with the third person to receive one or more messages.

10. The system of claim 9 wherein the instructions further cause the system to allow the third person to specify a method of receiving the one or more messages on the electronic device associated with the third person.

11. The system of claim 9 wherein the instructions further cause the system to allow the third person to specify a number of video game titles.

12. The system of claim 8 wherein the selectable element is selectable by a spoken approval from the third person.

13. The system of claim 8 wherein the custom goal is based on game playing ability.

14. The system of claim 8 further comprising instructions that, when executed by the processor, cause the system to:

receive by the server an indication indicating that a fourth person wishes to subscribe to receive one or more messages from the server and receive by the server a subsequent indication indicating that the fourth person wishes to unsubscribe from receiving one or more messages from the server.

15. A non-transitory machine-readable storable medium embodying information indicative of instructions for causing one or more processors of a server to perform operations, the operations comprising:

receiving by the server, a custom goal for the video game, the custom goal specified by a first person;

receiving by the server an indicator that a second person playing an instance of the video game has met or exceeded the custom goal in the video game;

preparing a message indicating that the second person has met or exceeded the custom goal;

sending the message to an electronic device associated with a third person with a selectable element enabled to begin a second instance of the video game for the third person at a specified point of the video game associated with the custom goal;

retrieving from an electronic device associated with the second person, a game state condition of the first instance of the video game; and beginning the second instance of the video game using the retrieved game state condition on the device associated with the third person in response to a selection of the selectable element.

16. The machine-readable storable medium of claim 15 wherein the operations further allow the third person to register to the server the electronic device associated with the third person to receive one or more messages.

17. The machine-readable storable medium of claim 16 wherein the operations further allow the third person to specify a method of receiving the one or more messages on the electronic device associated with the third person.

18. The machine-readable storable medium of claim 16 wherein the operations further allow the third person to specify a number of video game titles.

19. The machine-readable storable medium of claim 15 wherein the selectable element is selectable by a spoken approval from the third person.

20. The machine-readable storable medium of claim 15 further comprising instructions for causing the one or more processors of a server to perform operations of:

receiving by the server a first indication indicating that a fourth person wishes to subscribe to receive one or more messages from the server and receiving by the server a subsequent indication indicating that the fourth person wishes to unsubscribe from receiving one or more messages from the server.

* * * * *